United States Patent
Yoshino

(12) United States Patent (10) Patent No.: US 6,390,417 B1
Yoshino (45) Date of Patent: May 21, 2002

(54) DRAG CONTROL SYSTEM FOR FLYING MACHINE, PROCESS FOR ESTIMATING DRAG OF FLYING MACHINE, BOUNDARY LAYER CONTROL SYSTEM, AND BOUNDARY LAYER CONTROL PROCESS

(75) Inventor: Ryutaro Yoshino, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/606,010

(22) Filed: Jun. 29, 2000

(30) Foreign Application Priority Data

Jun. 30, 1999 (JP) .......................... 11-185909
Jun. 30, 1999 (JP) .......................... 11-185910

(51) Int. Cl.$^7$ .............................. B64C 13/16
(52) U.S. Cl. ...................... 244/203; 244/195
(58) Field of Search ............... 246/203, 214, 246/215, 216, 113, 194, 195

(56) References Cited

U.S. PATENT DOCUMENTS

| | | | |
|---|---|---|---|
| 4,741,503 A | | 5/1988 | Anderson et al. |
| 4,769,759 A | * | 9/1988 | McGough .................. 244/181 |
| 4,802,642 A | * | 2/1989 | Mangiarotty ............... 244/200 |
| 4,899,284 A | | 2/1990 | Lewis et al. |
| 4,932,610 A | * | 6/1990 | Mastrello .................... 244/203 |
| 4,936,146 A | * | 6/1990 | Stack et al. ................. 244/204 |
| 5,365,490 A | * | 11/1994 | Katz ........................... 244/204 |
| 5,499,025 A | * | 3/1996 | Middleton et al. ............. 701/15 |
| 5,606,505 A | * | 2/1997 | Smith et al. .................. 701/15 |
| 6,253,126 B1 | * | 6/2001 | Palmer ......................... 701/14 |

FOREIGN PATENT DOCUMENTS

| | | | |
|---|---|---|---|
| GB | 937046 | * 9/1963 | ............... 244/203 |
| GB | 2096551 | * 10/1982 | ............... 244/203 |
| JP | 10-281115 | 10/1998 | |

\* cited by examiner

*Primary Examiner*—Galen L. Barefoot
(74) *Attorney, Agent, or Firm*—Arent Fox Kintner; Plotkin & Kahn, PLLC

(57) ABSTRACT

The thrust T of an airplane is estimated by a thrust estimating device, and the motion state (the speed, the angular speed, the attitude angle and the elevation angle) of the airplane is detected by a motion state detecting device. Then, a drag estimating device estimates the drag D of the airplane, based on the thrust T and the motion state of the airplane. An operation-amount calculating device converges the steering angle into a target steering angle at which the drag of the airplane is minimized, by repeating the operation of varying the steering angle of a flap by a very small angle by an operating device, and further varying the steering angle by a very small angle, while monitoring the increase or decrease in drag resulting from such variation. Such a drag reducing control is carried out, while monitoring the actual drag and hence, is extremely effective, and also can exhibit an effectiveness, irrespective of the motion state of the airplane.

15 Claims, 13 Drawing Sheets

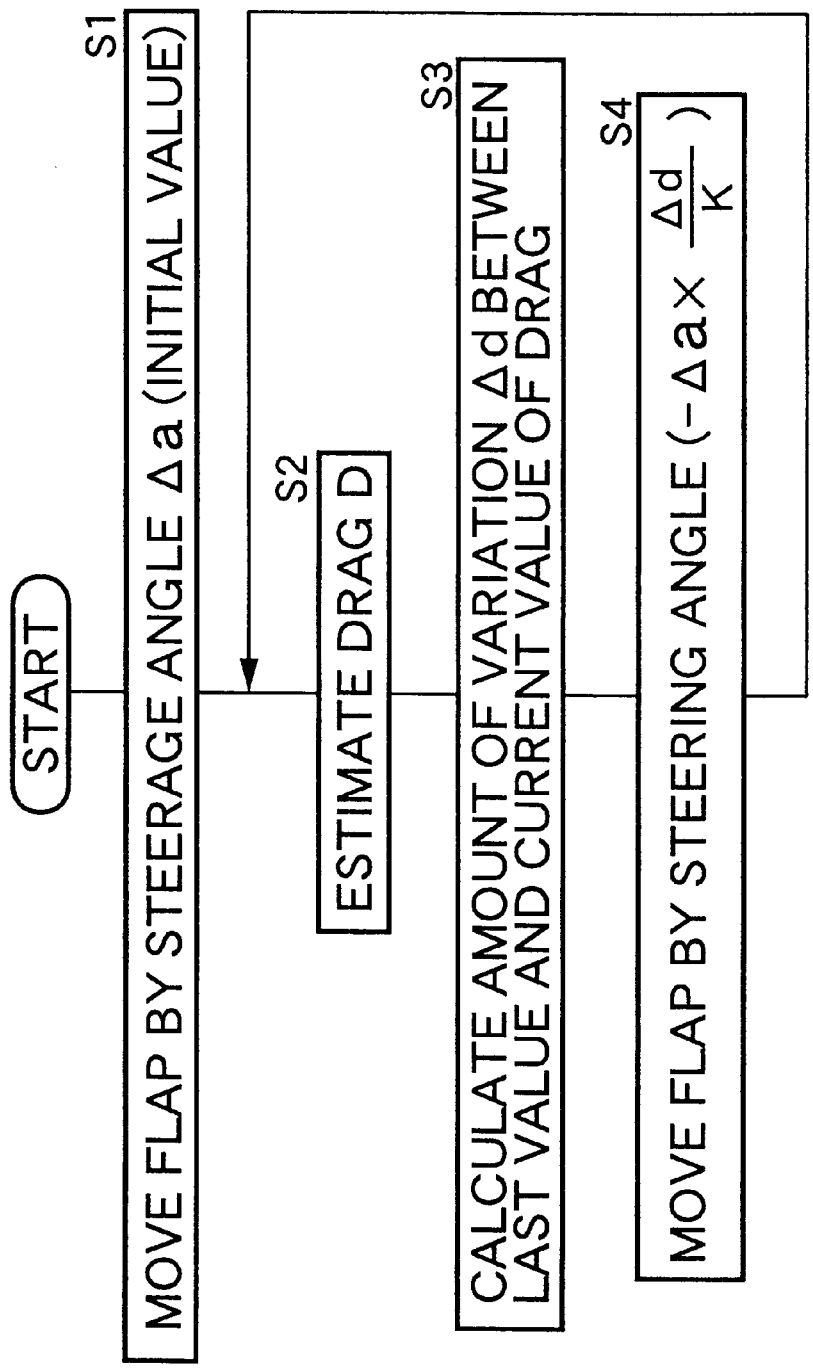

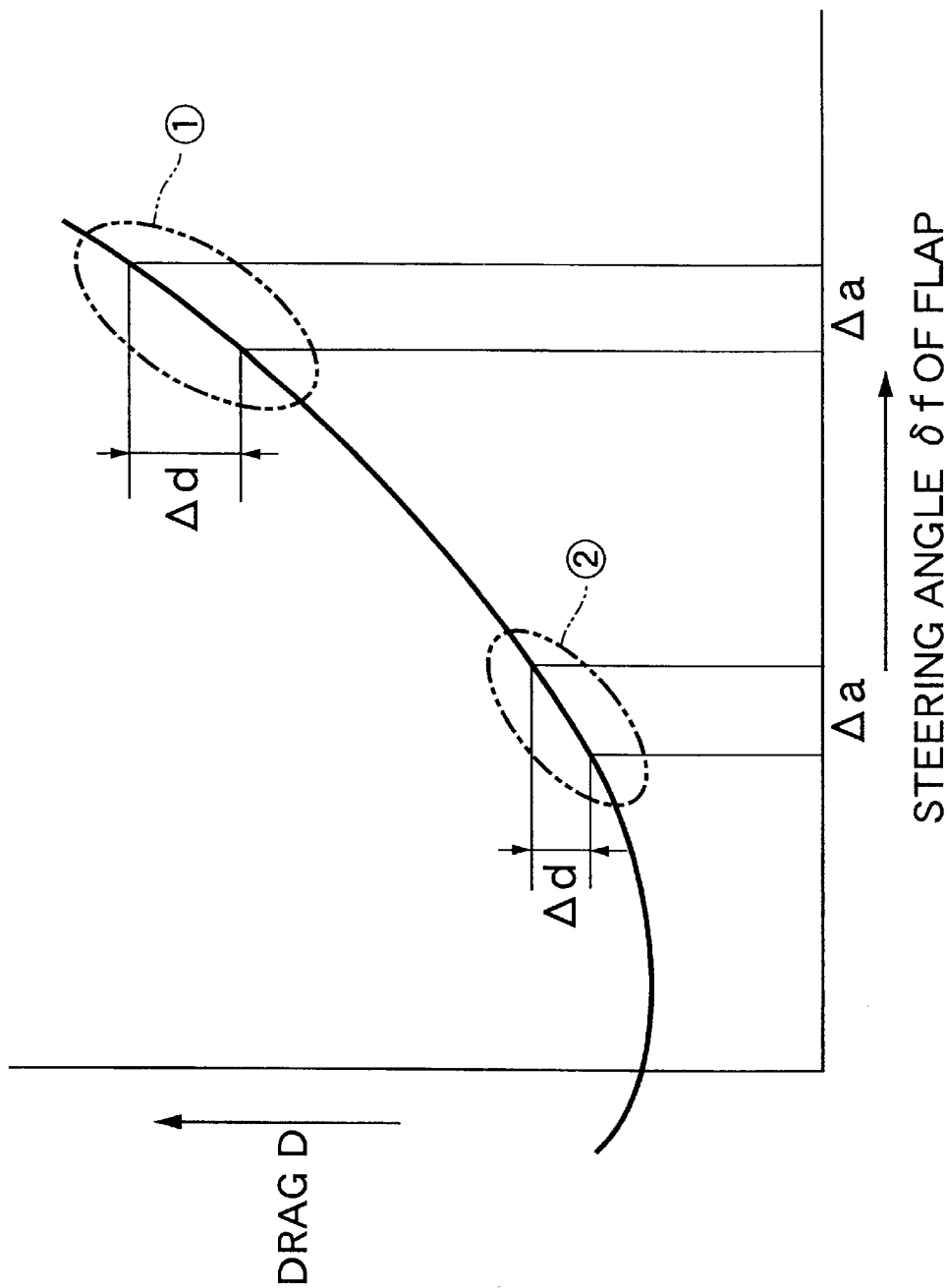

DRAG CONTROL SYSTEM FOR FLYING MACHINE, PROCESS FOR ESTIMATING DRAG OF FLYING MACHINE, BOUNDARY LAYER CONTROL SYSTEM, AND BOUNDARY LAYER CONTROL PROCESS

BACKGROUND OF THE INVENTION

1. Field of the Invention

The present invention relates to a drag control system for reducing the drag of an airplane or other kinds of flying machines, and a drag estimating process, and further relates to a boundary layer control system and a boundary layer control process for reducing the drag of a moving member such as a main wing of all airplane.

2. Description of the Related Art

When a flying machine flies in the air, a great deal of energy is lost due to air drag and this causes an increase in amount of fuel consumed. In an area on the surface of the flying machine where a boundary layer is transitioned to a turbulent-flow boundary layer section, particularly due to the large Reynold's number of the flow, the loss of energy due to the friction drag of air is of a disregardable magnitude. For this reason, the transition to the turbulent-flow boundary layer section is retarded or moved back on the surface, to reduce the friction drag by maintaining a laminar-flow boundary layer section over as long an area as possible. A laminar-flow wing is well-known as a wing type developed based on such a demand.

However, the airplane flies under a variety of different conditions of speed, atmospheric temperature, altitude, attitude and the like and hence, when a laminar-flow wing is used, it is difficult to reduce the friction drag under all flying conditions. A system is known from Japanese Patent Application Laid-open No. 10-281115, which is designed to prevent the transition and peel-off of the boundary layer to reduce the friction drag by detecting the state of air flow on the surface of an object such as a main wing of an airplane using a sensor and providing vibration to the surface of the object or by ejecting air to the surface of the object from a nozzle in accordance with the detected state of air flow.

However, the system described in the above Publication suffers from the problem that a means for providing the vibration to the surface of the object or a means for ejecting air to the surface of the object is required, resulting in an increased weight and an increased cost. Moreover, another problem is that it is difficult to effectively reduce the air drag, because a sensor only detects the state of the air flow on the surface of the object, and does not detect the air drag directly.

Further, the system described in the above Publication has the problem that it is difficult to conduct a precise control for moving the transition point rearwards as far as possible to minimize the drag, because the sensor detects premonitory symptoms of occurrence of the transition and peel-off of the boundary layer, but is not intended to monitor the movement of a transition point of the boundary layer.

SUMMARY OF THE INVENTION

Accordingly, it is a first object of the present invention to provide a drag control system for effectively reducing the drag in various motion states of the flying machine, and a drag estimating process.

It is a second object of the present invention to provide a boundary layer control system and a boundary layer control process for effectively reducing the drag in various motion states of the moving member.

To achieve the above first object, according to a first aspect and feature of the present invention, there is provided a drag control system for a flying machine, comprising a thrust estimating means for estimating the thrust of the flying machine flying in the air, a motion state detecting means for detecting the motion state of the flying machine, a drag estimating means for estimating the drag of the flying machine, based on the detected motion state and the estimated thrust, a drag varying means for varying the drag of the flying machine, an operation-amount calculating means for calculating the amount of operation of the drag varying means for minimizing the estimated drag, and an operating means for operating the drag varying means, based on the calculated amount of operation.

With the above arrangement, the amount of operation of the drag varying means for minimizing the drag estimated from the thrust and motion state of the flying machine, is calculated, and the drag varying means is operated based on the calculated amount of operation. Therefore, the drag of the flying machine can be reduced effectively to enhance the energy efficiency, irrespective of the motion state of the flying machine.

To achieve the first object, according to a second aspect and feature of the present invention, there is provided a process for estimating the drag of a flying machine flying in the air, comprising a first step of estimating a thrust T of the flying machine, a second step of detecting the motion state of the flying machine by detecting the following conditions:

$\phi$: the roll attitude angle (an Eulerian angle about an X axis);

$\theta$: the pitch attitude angle (an Eulerian angle about a Y axis);

U: the speed in a direction of the X axis;

V: the speed in a direction of the Y axis;

W: the speed in a direction of the Z axis;

P: the roll angular speed (an angular speed about the X axis);

Q: the pitch angular speed (an angular speed about the Y axis);

R: the yaw angular speed (an angular speed about the Z axis);

$\alpha$: the pitch angle formed by the direction of movement of the flying machine and the center angle of the flying machine, a third step of calculating components Xa and Za of the air force in the directions of the X and Z axes applied to the flying machine by substituting the motion state detected at the second step into the following first equations:

$$Xa = m \cdot (dU/dt + Q \cdot W - R \cdot V) + m \cdot g \cdot \sin\theta \quad (1a)$$

$$Za = m \cdot (dW/dt + P \cdot V - Q \cdot U) - m \cdot g \cdot \cos\theta \cdot \cos\phi \quad (1b)$$

wherein g is the gravitational acceleration, and m is the mass of the flying machine, a fourth step of calculating the drag D of the flying machine by substituting the thrust T estimated at the first step, the pitch angle $\alpha$ detected at the second step and the components Xa and Za of the air force in the directions of the X and Z axes calculated at the third step into the following second equation:

$$D = (T - Xa) \cdot \cos\alpha - Za \cdot \sin\alpha \quad (2)$$

the third and fourth steps being carried out sequentially, after the first and second steps are carried out, irrespective of the order.

With the above arrangement, the thrust T of the flying machine is estimated at the first step, and the motion state of the flying machine including the pitch angle α is detected at the second step. The components of the air force in the directions of the X and Z axes applied to the flying machine, are calculated from the motion state at the third step, and the drag D of the flying machine is calculated from the thrust T, the pitch angle α and the components Xa, Za of the air force in the directions of the X and Z axes at the fourth step. Therefore, the drag D of the flying machine can be calculated precisely, irrespective of the motion state of the flying machine.

To achieve the second object, according to a third aspect and feature of the present invention, a boundary layer control system for controlling a boundary layer formed along the surface of a moving member is provided. The boundary layer control systems comprises a transition-point detecting means for detecting a transition point at which the boundary layer is transitioned from a laminar-flow boundary layer section to a turbulent-flow boundary layer section, a transition-point moving means for moving the position of the transition point along the surface of the moving member, and a control means for controlling the transition-point moving means, so that the distance from a front end of the moving member to the transition point is maximized.

With the above arrangement, the transition point, at which the boundary layer is transitioned from the laminar-flow boundary layer section to the turbulent-flow boundary layer section, is detected by the transition-point detecting means, and the transition-point moving means is controlled by the control means to maximize the distance from the front end of the moving member to the transition point. Therefore, the drag of the moving member can be reduced effectively, irrespective of the motion state of the moving member to enhance the energy efficiency. Particularly, the control is carried out, while directly monitoring that distance from the front end of the moving member to the transition point, which corresponds to the length of the laminar-flow boundary layer section where the drag is small. Therefore, it is possible to carry out a drag reducing control with extremely high accuracy.

To achieve the second object, according to a fourth aspect and feature of the present invention, there is provided a boundary layer control process for controlling the boundary layer formed along the surface of a moving member, comprising a first step of detecting a transition point at which the boundary layer is transitioned from a laminar-flow boundary layer section to a turbulent-flow boundary layer section, a second step of operating a transition-point moving means to move the position of the transition point rearwards, a third step of stopping the operation of the transition-point moving means, when the rearward movement of the transition point is stopped, and a fourth step of repeating the second and third steps, when the transition point starts to move.

With the above arrangement, the transition point, at which the boundary layer is transitioned from the laminar-flow boundary layer section to the turbulent-flow boundary layer section, is detected, and the transition-point moving means is operated so that the transition point assumes a rearmost position. Therefore, the drag of the moving member can be reduced, irrespective of the motion state of the moving member, thereby enhancing the energy efficiency. Particularly, the control is carried out, while directly monitoring the position of the transition point corresponding to the length of the laminar-flow boundary layer section where the drag is small and hence, the drag reducing control can be carried out with extremely high accuracy.

BRIEF DESCRIPTION OF THE DRAWINGS

The above and other objects, features and advantages of the invention will become apparent from the following description of the preferred embodiments taken in conjunction with the accompanying drawings.

FIGS. 1 to 11 show a first embodiment of the present invention, wherein

FIG. 1 is an illustration of a profile of a main wing of an airplane.

FIG. 2 is a block diagram for a drag reducing control of the airplane.

FIG. 3 is a diagram showing the relationship among the dynamic lift L, the drag D, the thrust T and the elevation angle α in the longitudinal motion of the airplane.

FIG. 4 is a diagram showing X, Y and Z coordinate axes and variables representing the motion state of the airplane.

FIG. 5 is a graph showing the characteristic of variation in drag coefficient relative to the elevation angle at the time when the steering angle of a flap has been varied diversely.

FIG. 6 is a block diagram for a flight control.

FIG. 7 is a flow chart for a drag reducing control.

FIG. 8 is a diagram showing the relationship between the steering angle of the flap and the drag.

FIGS. 12 and 13 show a second embodiment of the present invention, wherein:

FIG. 12 is an illustration showing the arrangement of a boundary layer control system for a main wing of an airplane.

FIG. 13 being a flow chart for a boundary layer control.

DESCRIPTION OF THE PREFERRED EMBODIMENTS

A first embodiment of the present invention will now be described with reference to the accompanying drawings.

Figure 1:
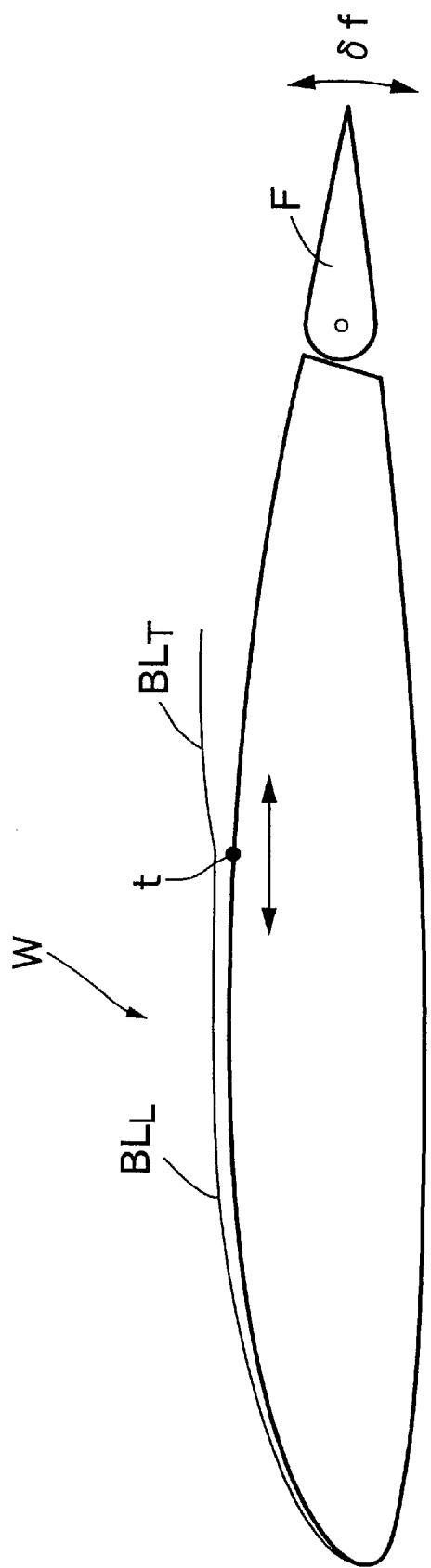

FIG. 1 shows a profile of a main wing W of an airplane as a flying machine which flies in the air. A flap F as a movable wing surface which is a drag changing means of the present invention, is mounted at a rear edge of the main wing W, so that the steering angle δf can be changed downwards and upwards. A boundary layer formed along the surface of the main wing W is comprised of an upstream laminar flow boundary layer section $BL_L$ and a downstream turbulent flow boundary layer section $BL_T$. The position of the transition point t between the laminar flow boundary layer section $BL_L$ and the turbulent flow boundary layer section $BL_T$ is moved longitudinally by changing the steering angle δf of the flap F. The friction drag of the laminar flow boundary layer section $BL_L$ is remarkably small, as compared with the friction drag of the turbulent flow boundary layer section $BL_T$. Hence, if the transition point t between the laminar flow boundary layer section $BL_L$ and the turbulent flow boundary layer section $BL_T$ is moved toward the rear edge by controlling the steering angle δf of the flap F, the area of the laminar flow boundary layer section $BL_L$ can be enlarged to reduce the drag of the main wing W.

Figure 2:
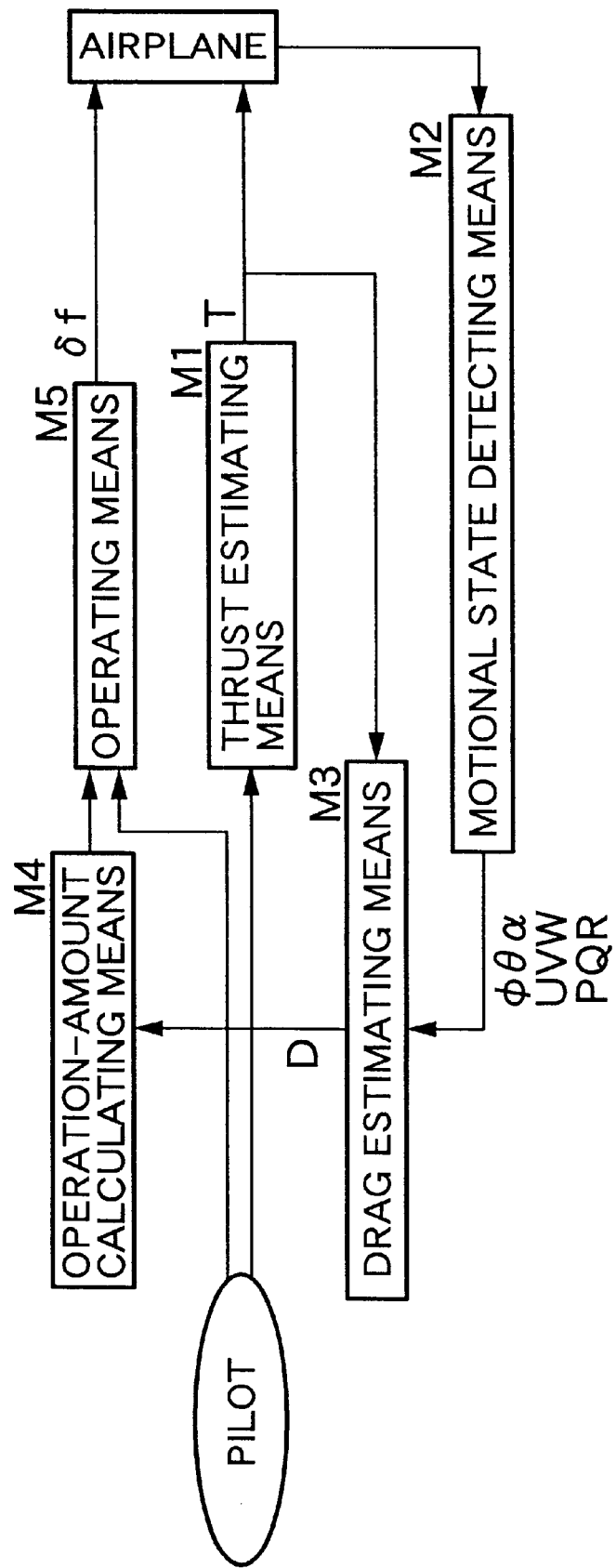

As shown in FIG. 2, a control system for the steering angle δf of the flap F includes a thrust estimating means M1 for estimating the thrust T of the airplane, a motion state detecting means M2 for detecting the motion state (the speed, the angular speed, the attitude angle and the elevation angle) of the airplane, a drag estimating means M3 for estimating the drag D of the airplane, based on the thrust T and the motion state of the airplane, and an operation-amount calculating means M4 for calculating the operation amount for the steering angle δf of the flap F for minimizing the drag D, based on a change in the drag D generated by changing the steering angle δf of the flap F, and an operating means M5 for changing the steering angle δf of the flap F, based on the operation amount.

The thrust T of the airplane is changed by the operation of a throttle lever by the pilot, and the thrust estimating means M1 estimates the magnitude of the thrust T based on the rotational speed of the engine.

Variants representing the motion state of the airplane detected by the motion state detecting means M2 are as follows;

φ: the roll attitude angle (an Eulerian angle about an X axis);

θ: the pitch attitude angle (an Eulerian angle about a Y axis);

U: the speed in a direction of the X axis;

V: the speed in a direction of the Y axis;

W: the speed in a direction of the Z axis;

P the roll angular speed (an angular speed about the X axis);

Q: the pitch angular speed (an angular speed about the Y axis),

R: the yaw angular speed (an angular speed about the Z axis);

α: the pitch angle (an elevation angle α) formed by the direction of movement of the flying machine and the center angle of the flying machine.

The roll attitude angle φ, the pitch attitude angle θ and the elevation angle α can be detected by a vertical gyro or the like; the roll angular speed P, the pitch angular speed Q and the yaw angular speed R can be detected by a rate gyro or the like; and the speed U in the direction of the X axis, the speed V in the direction of the Y axis and the speed W in the direction of the Z axis can be detected by a Pitot tube or the like.

The estimation of the thrust T by the thrust estimating means M1 and the detection of the motion state of the airplane by the motion state detecting means M2 may be carried out in any order. More specifically, the motion state may be detected after the estimation of the thrust T; or the thrust T may be estimated after the detection of the motion state; or both the estimation of the thrust T and the detection of the motion state may be carried out simultaneously.

The drag estimating means M3 estimates the drag D of the airplane, based on the thrust T estimated by the thrust estimating means M1 and the motion state φ, θ, U, V, W, Z, P, Q, R and α detected by the motion state detecting means M2. The procedure of the estimation of the drag D will be described below.

Figure 3:
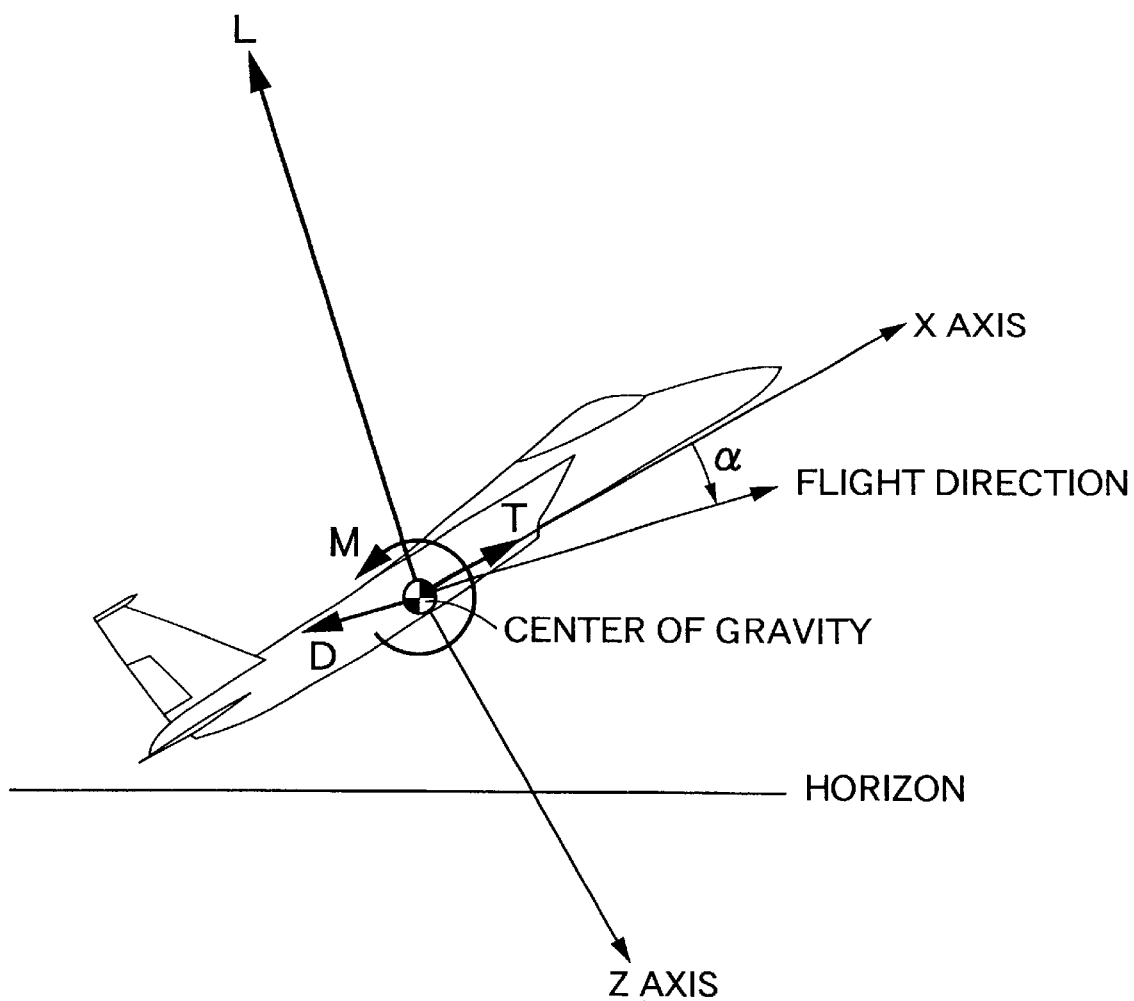

FIG. 3 shows the relationship among the dynamic lift L, the drag D, the thrust T and the elevation angle α using X, Y and Z coordinate axes (stable axes with the X axis matched with a direction of a speed vector of the airplane body during a steady-balanced flight of the airplane). An air force Xa in the direction of the X axis and an air force Za in the direction of the Z axis are given using the dynamic lift L, the drag D, the thrust T and the elevation angle α from the balance of the forces in the directions of the X and Z axes according to the following equations:

$$Xa = T + L \cdot \sin \alpha - D \cdot \cos \alpha \qquad (3)$$

$$Za = L \cdot \cos \alpha - D \cdot \sin \alpha \qquad (4)$$

If the dynamic lift L is eliminated from the equations (3) and (4), the drag D is given according to the following equation:

$$D = (T - Xa) \cdot \cos \alpha - Za \cdot \sin \alpha \qquad (5)$$

The equation (5) indicates that if the air force Xa in the direction of the X-axis, the air force Za in the direction of the Z axis, the thrust T and the elevation angle α are known, the drag D can be estimated. The thrust T can be estimated by the thrust estimating means M1, and the elevation angle α can be detected by the motion state detecting means M2. The remaining air forces Xa and Za in the directions of the X and Z axes can be calculated in the following manner from the motion state detected by the motion state detecting means M2.

Figure 4:
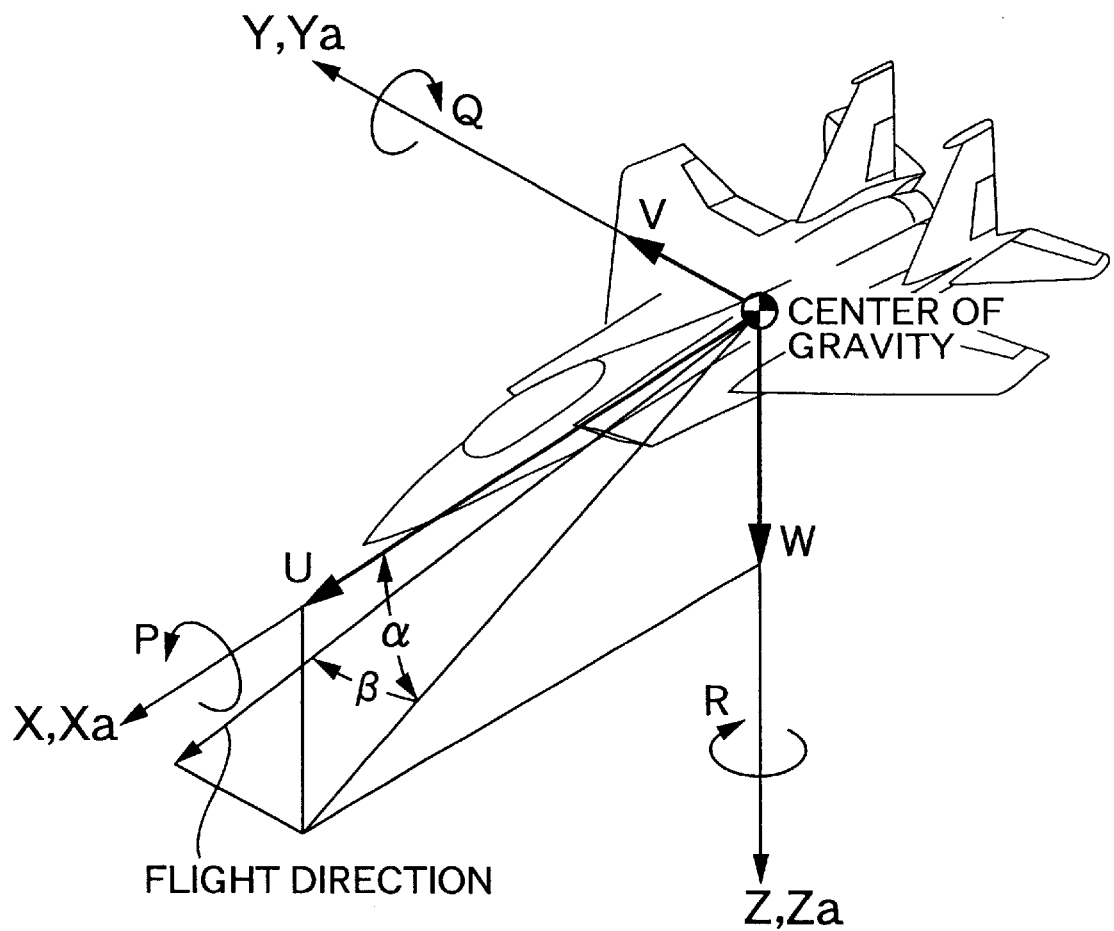

As is well known, the equations for the motions of the airplane in the directions of the X and Z axes are represented by the following equations (6) and (7) wherein m represents the mass of the airplane body, and g represents the gravitational acceleration (see FIG. 4). In this case, the mass m of the airplane body and the gravitational acceleration g are known, and the variation in mass m with consumption of fuel can be calculated. Further, the motion state φ, θ, U, V, W, Z, P, Q, R and α of the airplane can be detected by the motion state detecting means M2.

$$m \cdot (dU/dt + Q \cdot W - R \cdot V) = -m \cdot g \cdot \sin \theta + Xa \qquad (6)$$

$$m \cdot (dW/dt + P \cdot V - Q \cdot U) = m \cdot g \cdot \cos \theta \cdot \cos \phi + Za \qquad (7)$$

Therefore, the air force Xa in the direction of the X axis and the air force Za in the direction of the Z axis are given according to equations (8) and (9), and if the air forces Xa and Za are substituted into the equation (5), the drag D of the airplane can be calculated.

$$Xa = m \cdot (dU/dt + Q \cdot W - R \cdot V) + m \cdot g \cdot \sin \theta \qquad (8)$$

$$Za = m \cdot (dW/dt + P \cdot V - Q \cdot U) - m \cdot g \cdot \cos \theta \cdot \cos \phi \qquad (9)$$

Then, an operation amount for the steering angle δf of the flap F for minimizing the drag D of the airplane is calculated by the operation-amount calculating means M4. The procedure of the calculation of the operation amount will be described below.

Figure 5:
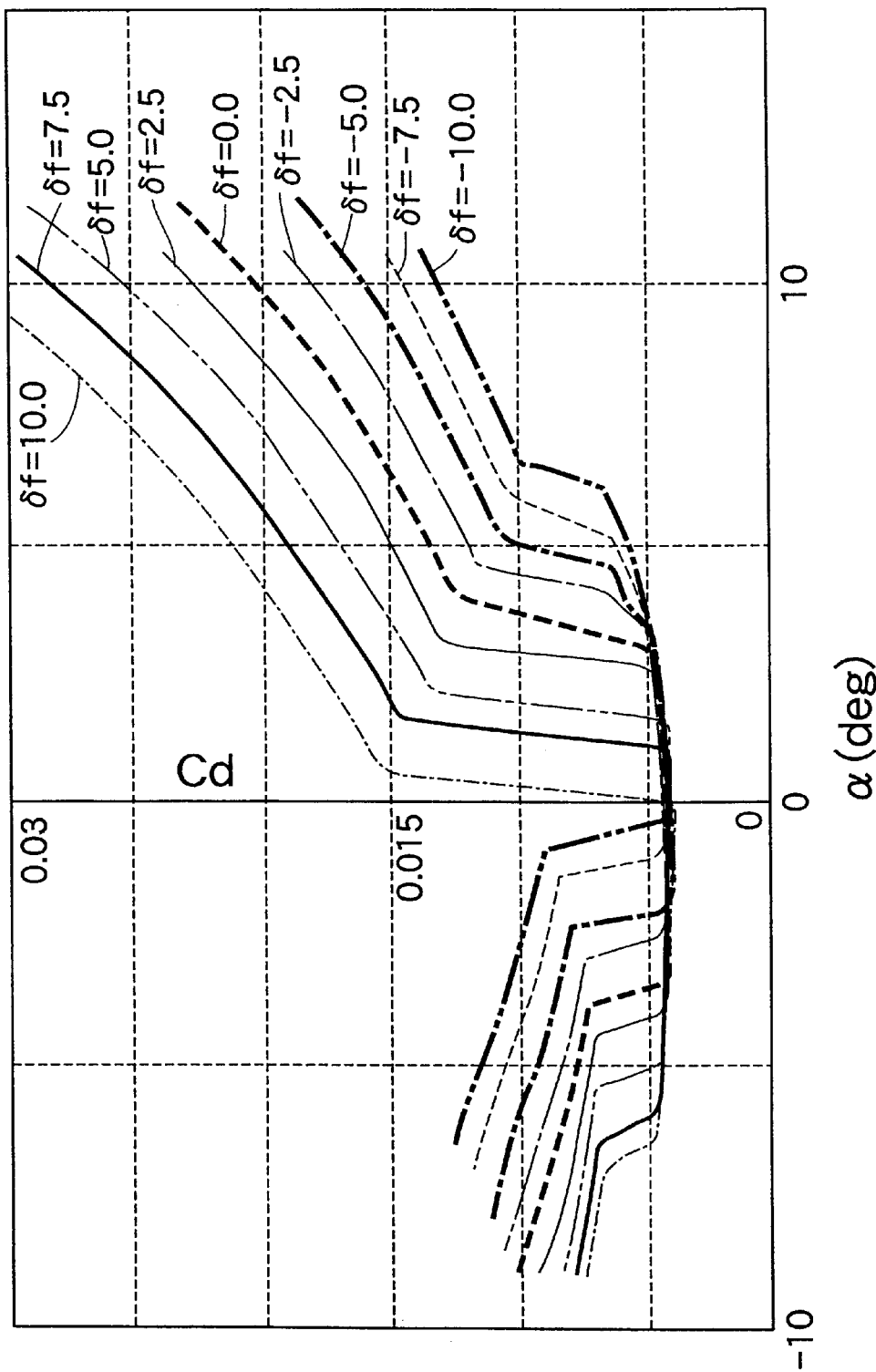

FIG. 5 shows the characteristic in variation of a drag coefficient $C_D$ relative to the elevation angle α when the steering angle δf of the flap F has been varied to various values. FIG. 5 indicates that even if the elevation angle α is any value, the drag coefficient $C_D$ is varied in accordance with the variation in steering angle δf of the flap F. In other words, if the steering angle δf the flap F is varied, the drag coefficient $C_D$ can be varied.

Figure 6:
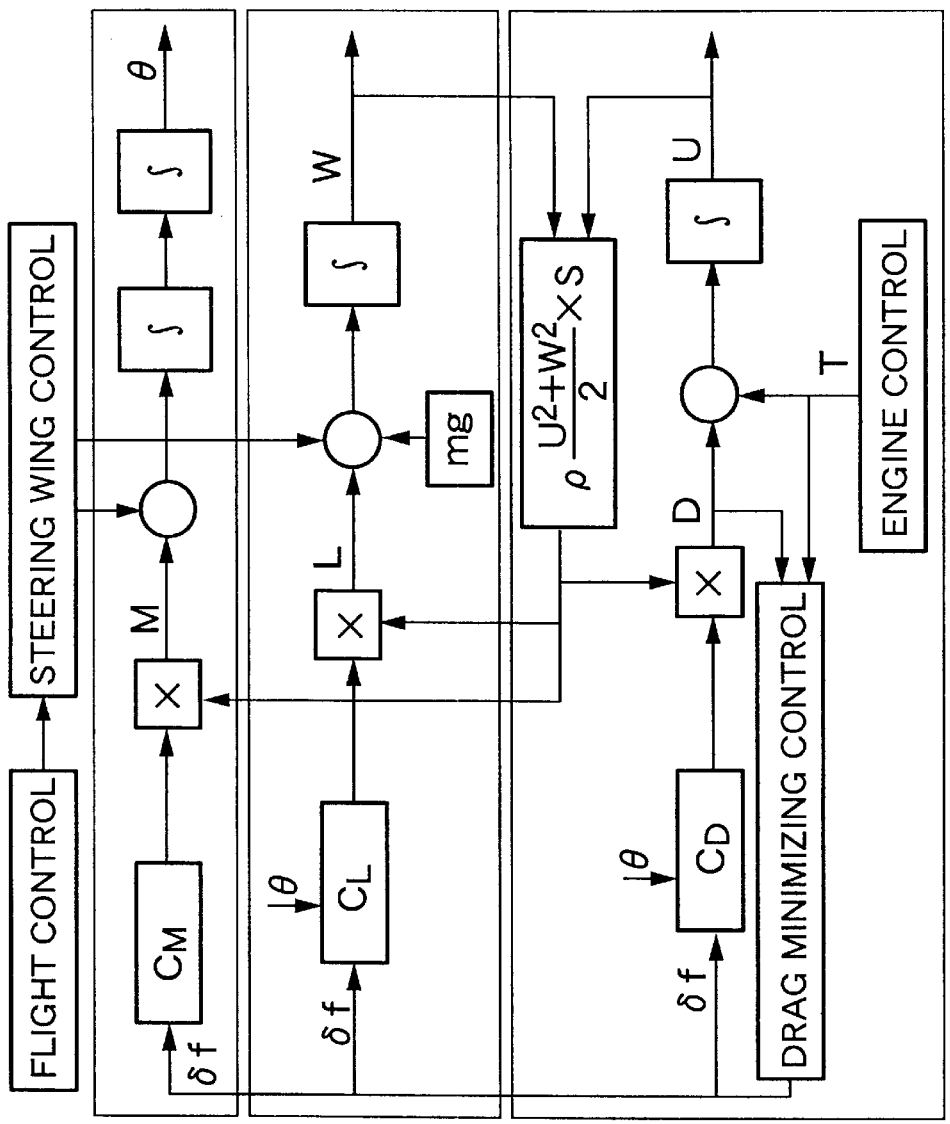

FIG. 6 shows a system for reducing the drag D of the airplane by varying the steering angle δf of the flap F. If the steering angle of δf the flap F is varied by a drag reducing control, a pitching moment coefficient $C_M$ is varied, and a pitching moment M is calculated by multiplying the pitching moment coefficient $C_M$ by the product of the dynamic pressure $\rho(U^2+W^2)/2$. The wing area 5 is further varied by controlling a steering wing such as an elevator or the like. The pitch attitude angle θ of the airplane is calculated by doubly integrating the pitching moment M.

A dynamic lift coefficient $C_L$ is varied by the variation in steering angle δf of the flap F and the variation in pitch attitude angle θ by the drag reducing control. A dynamic lift L calculated by multiplying the dynamic lift coefficient $C_L$ by the product of the dynamic pressure $\rho(U^2+W^2)/2$ and the wing area S, is further varied by controlling the steering wing. A speed W in the direction of the Z axis is calculated by integrating a value resulting from the subtraction of the weight mg of the airplane body from the dynamic lift L.

The drag coefficient $C_D$ is varied by the variation in steering angle δf of the flap F and the variation in pitch attitude angle θ by the drag reducing control. A drag D calculated by multiplying the drag coefficient $C_D$ by the product of the dynamic pressure $\rho(U^2+W^2)/2$ and the wing area S, is added to the thrust T varied by an engine control, and the resulting value is integrated, thereby calculating a speed U in the direction of the X axis.

The drag D calculated in the above manner is used repeatedly in a drag reducing control along with the thrust T, and the steering angle δf of the flap F is renewed to minimize the drag D of the airplane.

The contents of the drag reducing control will be described below with reference to a flow chart in FIG. 7.

First, the steering angle δf of the flap F is increased by a preset initial value a at Step S1 and then, a drag D is estimated according to the equation (5) at Step S2. An amount of variation Δd between a last value and a current value of the drag D is calculated at Step S3. If the amount of variation Δd is a positive value at Step S3 as a result of the increasing of the steering angle δf by the initial value Δa at Step S1, namely, if the drag D has been increased as a result of the increasing of the steering angle δf, the steering angle δf is decreased at Step S4. On the other hand, if the amount of variation Δd is a negative value at Step S3, namely if the drag D has been decreased as a result of the increasing of the steering angle δf, the steering angle δf is further decreased at Step S4. Thus, the steering angle δf of the flag F can be converged to a steering angle, at which the drag D is minimized, by repeating Steps S2 to S4.

The operation amount for the steering angle δf of the flap F is set at −Δax(Δd/K) (wherein K is a constant) rather than the initial value Δa at Step S4. The reason is that the operation amount for the steering angle of δf is increased in a region where the amount of variation Δd of the drag D varies relative to the amount of the initial value Δa and the amount of the variation is large as shown at (1) in FIG. 8, and the operation amount for the steering angle δf is decreased in a region where the amount of variation Δd of the drag D varies relative to the amount of the initial value Δa and the amount of the variation is small as shown at (2) in FIG. 8. Thus, it is possible to enhance the responsiveness and convergeability of the control for converging the steering angle δf to a target steering angle at which the drag D is minimized.

As described above, the steering angle δf of the flap F can be converged to the target steering angle at which the drag D of the airplane is minimized, by repeating the operation for varying the steering angle δf of the flap F by a very small angle by the operating means M5 and further varying the steering angle δf by a very small angle, while monitoring the increase and decrease in the resulting drag D. The drag reducing control is carried out while monitoring the actual drag D and hence, is extremely effective, but also can exhibit an effectiveness, irrespective of the motion state of the flying machine. Moreover, the flap F originally mounted on the main wing W of the airplane is utilized as a drag varying means and hence, a special drag varying means is not required, leading to a reduced weight and a reduced cost.

Figure 9A:
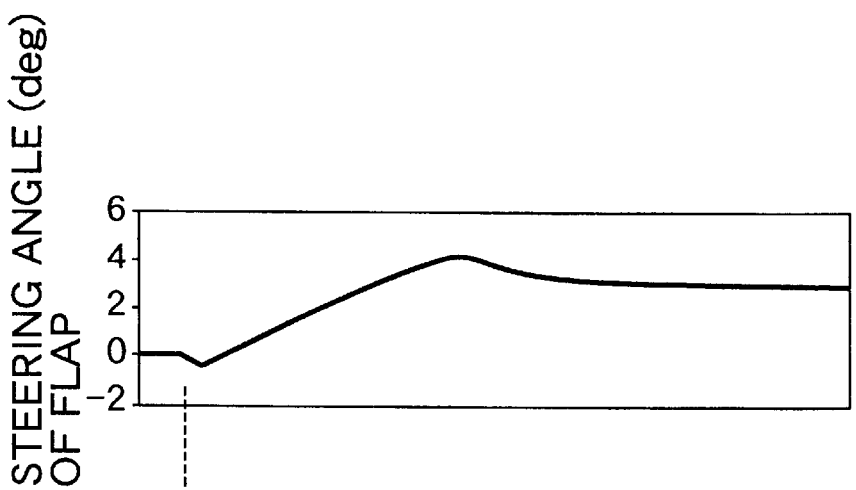
FIGS. 9A, 9B and 9C are graphs showing results of the simulation of the drag reducing control.
Figure 9B:
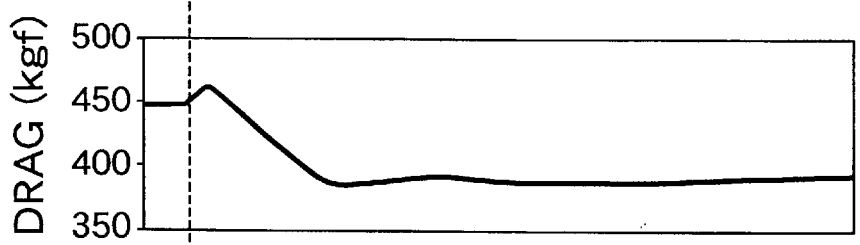
Figure 9C:
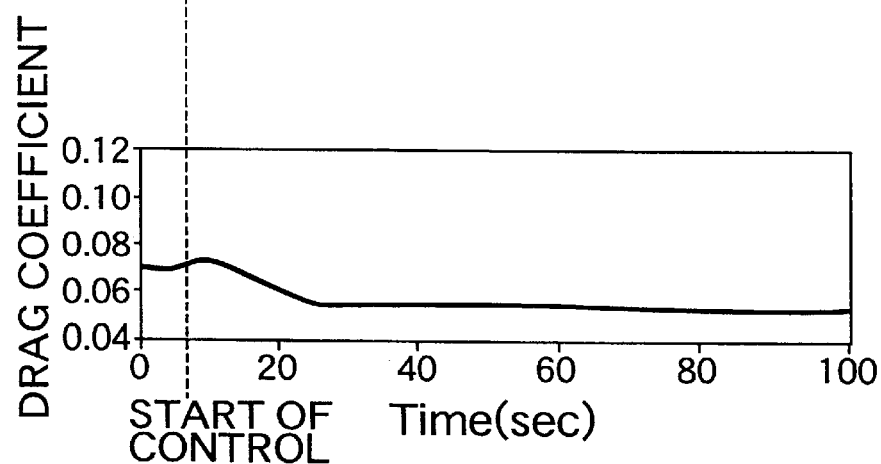

Results of calculation with the drag reducing control simulated are shown in FIGS. 9A to 9C. It can be confirmed that the drag D and the drag coefficient $C_D$ have been reduced by the variation in steering angle δf of the flap F.

Figure 10A:
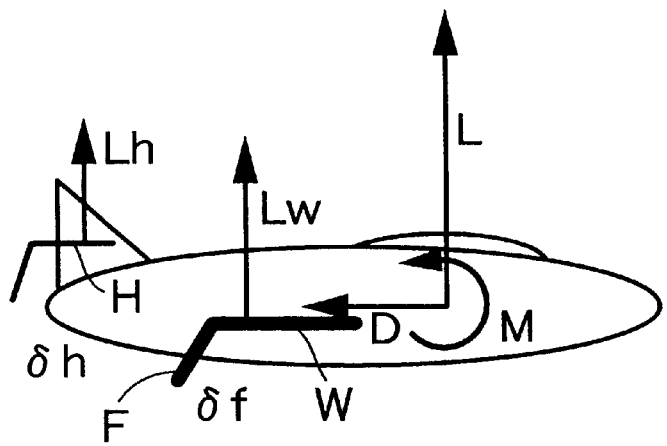
FIGS. 10A and 10B are diagrams for explaining the balance provided between the pitching moment and the dynamic lift by an elevator on a horizontal tail plane.
Figure 10B:
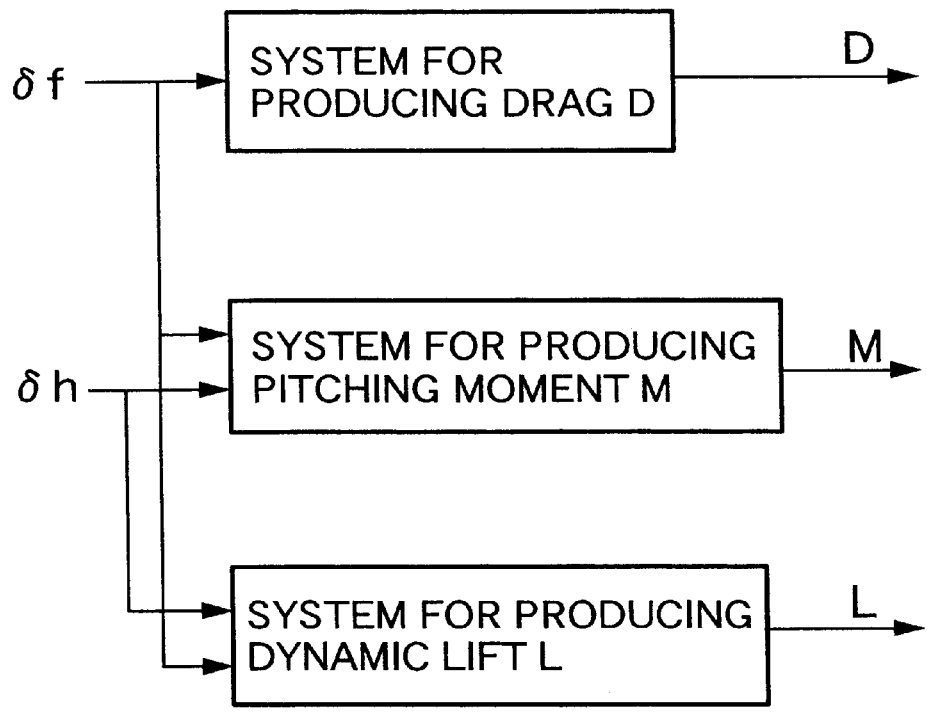

When the steering angle δf of the flap F is varied to reduce the drag D by the drag reducing control, as shown in FIGS. 10A and 10B, there is a possibility that the pitching moment M and the dynamic lift L are also varied with the variation in the steering angle δf of the flap F, whereby the attitude and the motion state of the flying machine are varied in an undesired direction. For example, when the flap F is operated in a lowering direction, a pitching moment M in a nosing-up direction is generated, and the dynamic lift Lw of the main wing W is increased. Thereupon, the dynamic lift Lh can be generated by trimming the elevator mounted on a horizontal tail plane H as a compensating means in the lowering direction, thereby generating a pitching moment M in the nosing-down direction by the dynamic lift Lh to maintain the balance about a pitch axis. Moreover, the increase in drag D with the operation of the elevator is negligible and hence, the drag D of the airplane is reliably reduced. However, the dynamic lift Lw of the main wing W is increased with the lowering operation of the flap F and further, the dynamic lift Lh of the horizontal tail plane H is also increased with the lowering operation of the elevator. Hence, the dynamic lift L of the entire airplane is increased.

Figure 11A:
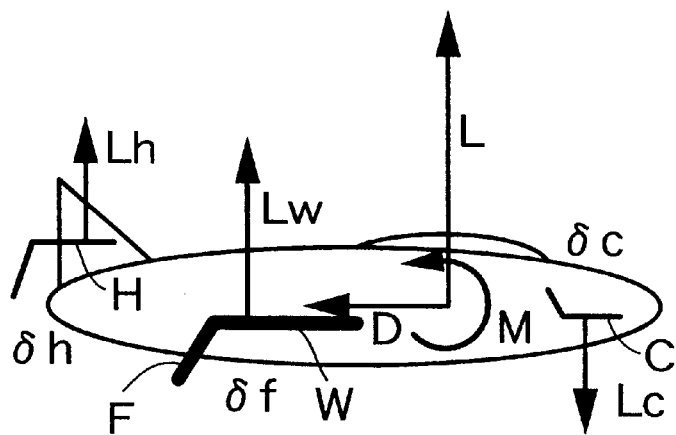
FIGS. 11A and 11B are diagrams for explaining the balance provided between the pitching moment and the dynamic lift by the elevator on the horizontal tail plane and an elevator on a canard.
Figure 11B:
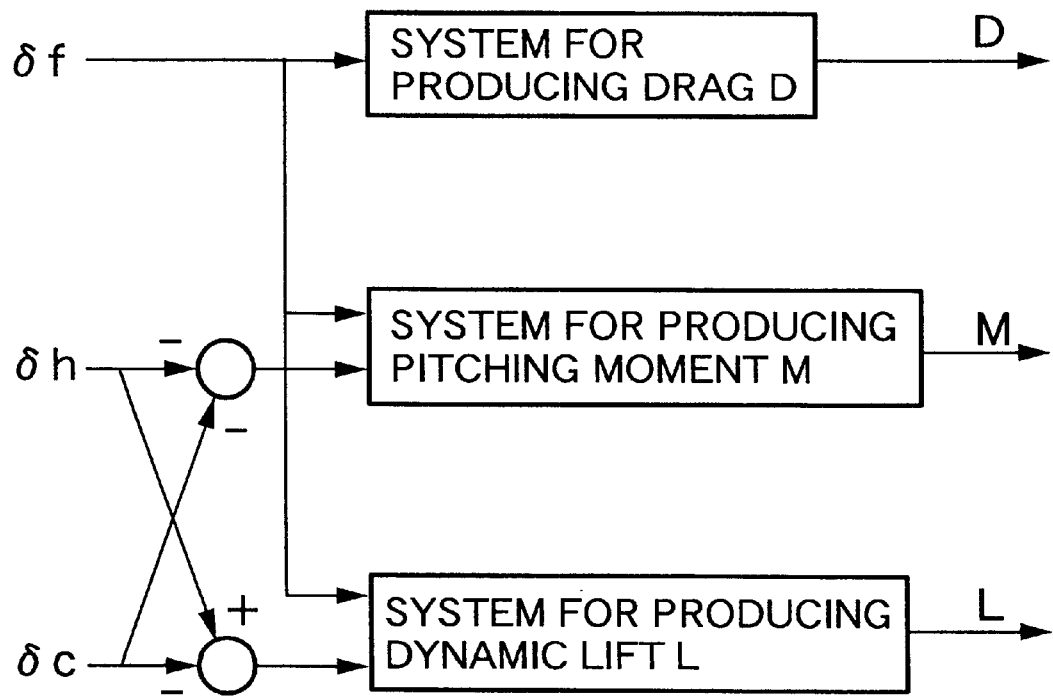

An example of an airplane equipped with a canard C, is shown in FIGS. 11A and 11B. For example, the pitching moment M in the nosing-up direction is generated with the operation of the flap F in a lowering direction. When the dynamic lift Lw of the main wing W is increased, the dynamic lift Lh is generated by trimming an elevator mounted on a horizontal tail plane H as a compensating means in the lowering direction and at the same time, a negative dynamic lift Lc is generated by trimming an elevator mounted on the canard C as a compensating means in the lifting direction. As a result, a pitching moment M in a nosing-down direction can be generated by the dynamic lift Lh generated by the horizontal tail plane H and the downward dynamic lift Lc generated by the canard C to maintain the balance about the pitch axis. Moreover, the dynamic lift Lh generated by the horizontal tail plane H and the downward dynamic lift Lc generated by the canard C, can be offset by each other to suppress the variation in dynamic lift L of the entire airplane to the minimum. Even in this case, the increase in drag D with the operation of the elevator on the horizontal tail plane H and the elevator on the canard C is negligible and hence, the drag D of the entire airplane is reliably reduced.

A second embodiment of the present invention will now be described with reference to FIGS. 11 and 12.

Figure 12:
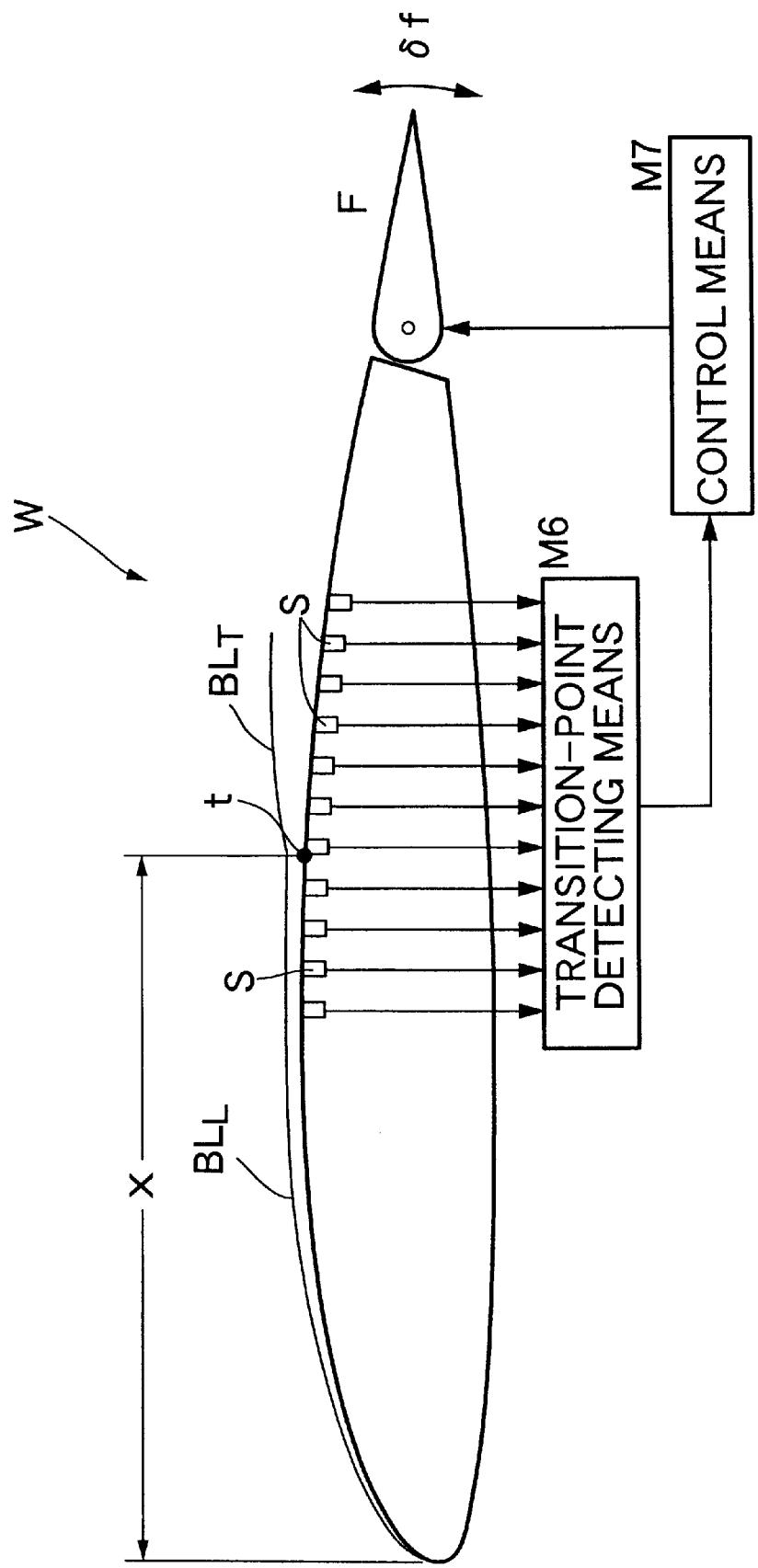

FIG. 12 shows a profile of a main wing W of an airplane. A boundary layer formed along a surface of the main wing W is comprised of an upstream laminar-flow boundary layer section $BL_L$ and a downstream turbulent-flow boundary layer section $BL_T$. The position of the transition point t between the laminar-flow boundary layer section $BL_L$ and the turbulent-flow boundary layer section $BL_T$ is moved longitudinally by varying the steering angle δf of a flap F which is a movable wing surface which is a transition-point moving means of the present invention. The friction drag of the laminar-flow boundary layer section $BL_L$ is remarkably small as compared with the friction drag of the turbulent-flow boundary layer section $BL_T$. Therefore, if the steering angle δf of the flap F can be controlled to move the transition point t between the laminar-flow boundary layer section $BL_L$ and the turbulent-flow boundary layer section $BL_T$ as far as possible toward the rear edge, the region of the laminar-flow boundary layer section $BL_L$ can be enlarged to reduce the drag D of the main wing W.

A large number of sensors S each comprising, for example, a hot film are provided on the surface of the main wing W. The hot film detects the motion state of air molecules within the boundary layer, based on the amount of heat dissipated, and a transition-point detecting means M6 receiving a signal input from the hot film detects the position of the transition point t, based on a difference between the motion states of air molecules in the laminar-flow boundary layer section $BL_L$ and the turbulent-flow boundary layer section $BL_T$. A control means M7 controls the steering angle δf of the flap F on the main wing W, based on the position of the transition point t input from the transition-point detecting means M6, whereby the distance x from a front edge of the main wing W to the transition point t is maximized by moving the position of the transition point t rearwards as far as possible, thereby reducing the drag D.

Figure 13:
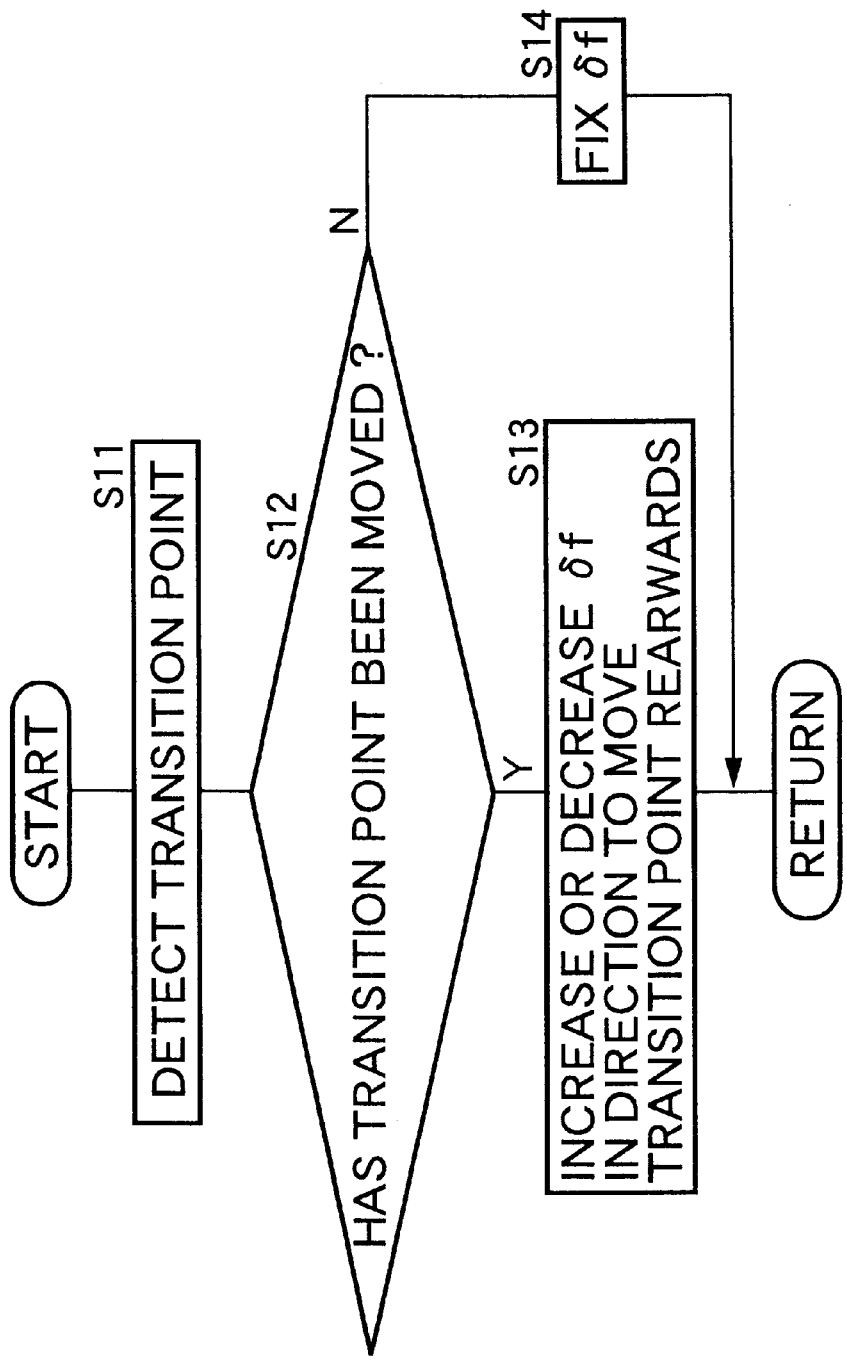

The contents of the boundary layer control carried out in the control means M7 will be described below with reference to a flow chart in FIG. 13.

First, the position of the transition point t is detected by the transition-point detecting means M6 at Step S11, and it is determined at Step S12 whether the transition point t has been moved by comparing the last position and the current position of the transition point t with each other. As a result, if the transition point t has been moved rearwards, the steering angle δf of the flap F is varied by a very small angle in the same direction as the previous time, to further move the transition point t rearwards at Step 913. On the other hand, if the transition point t has been moved forwards, the steering angle δf of the flap F is varied by a very small angle in a direction opposite from that at the previous time to further move the transition point t rearwards at Step S13. The steering angle δf of the flap F is controlled by repeating Steps S11 to S13, so that the position of the transition point t is moved rearwards.

When the position of the transition point t has been moved to a limit position to provide a maximum distance x from the front edge of the main wing W to the transition point t, namely, when the length of the laminar-flow boundary layer section $BL_L$ is maximized to provide a minimum drag D, the transition point t is substantially not moved at Step S12 and hence, the steering angle δf of the flap F is fixed at that position at Step S14. If all the conditions including the motion state of the airplane are not varied, the steering angle δf of the flap F is maintained at the position fixed at Step S14, and the position of the transition point t is also fixed. However, if the position of the transition point t is moved at Step S2 due to variation in the conditions, the steering angle δf of the flap F is varied by a very small angle at Step S13 to move the transition point t rearwards.

As a result, the position of the transition point t newly fixed, may be ahead or behind the last fixed position in some cases, but is controlled to a rearmost position at least within the conditions including the motion state of the airplane at that time. Even if the motion state of the airplane is varied diversely, the position of the transition point t from the laminar-flow boundary layer section $BL_L$ to the turbulent-flow boundary layer section $BL_T$ can be moved at all times rearwards as far as possible, to effectively reduce the drag D and to contribute to the conserving of energy.

The steering angle δf of the flap F can be converged to a target steering angle at which the drag D of the airplane is minimized, by repeating the operation for varying the steering angle of δf the flap F by a very small angle, and further varying the steering angle δf by a very small angle, while monitoring the resulting movement of the transition point t in the above manner. The boundary layer control is carried out while monitoring the actual position of the transition point t, and hence, is extremely effective, but also can exhibit an effectiveness, irrespective of the motion state of the airplane. Moreover, the flap F originally mounted on the main wing W of the airplane is utilized as a transition point moving means and hence, a special transition point moving means is not required, leading to a reduced weight and a reduced cost.

The boundary layer control enables the drag D and the drag coefficient $C_D$ to be reduced by the variation in steering angle δf of the flap F, as already described with reference to FIG. 9.

When the steering angle δf of the flap F is varied to reduce the drag D by the boundary layer control, there is a possibility that the pitching moment M and the dynamic lift L are also varied with the variation in the steering angle δf, whereby the attitude and the motion state of the airplane are varied in an undesired direction. In this case, the balance about the pitch axis can be maintained by the dynamic lift Lh of the elevator mounted on the horizontal tail plane H or the balance about the pitch axis can be maintained by the dynamic lift Lh of the elevator mounted on the horizontal tail plane H and the dynamic lift Lc of the elevator mounted on the canard C and at the same time, the variation in dynamic lift L of the entire airplane can be suppressed to the minimum, as already described with reference to FIGS. 10 and 11.

The airplane has been illustrated as the flying machine in the first embodiment, but the present invention is applicable to a glider which is a stationary-wing aircraft other than the airplane, a rotary-wing aircraft such as a helicopter, a missile and the like. The movable wing surface is not limited to the flap F in the embodiments and may be an aileron or an elevator.

The main wing W of the airplane has been illustrated as a moving member in the second embodiment, but the present invention is applicable to any moving member other than the main wing W of the airplane. The hot films have been illustrated as the sensors S which output the signal to the transition point detecting means M6 in the second embodiment, but any other sensors capable of detecting variations in pressure, temperature, sound and the like at the transition point t can be employed, and the transition point moving means is not limited to the flap F in the embodiments, and may be an aileron.

Although the embodiments of the present invention have been described in detail, it will be understood that the present invention is not limited to the above-described embodiments, and various modifications may be made without departing from the spirit and scope of the invention defined in claims.

What is claimed is:

1. A drag control system for a flying machine, comprising a thrust estimating means for estimating the thrust of the flying machine while flying in the air, a motion state detecting means for detecting a given motion state of the flying machine, a drag estimating means for estimating the drag of the flying machine, based on the detected motion state and the estimated thrust, a drag varying means for varying the drag of the flying machine, an operation-amount calculating means for calculating the amount of operation of the drag varying means for minimizing the estimated drag, and an operating means for operating the drag varying means, based on the calculated amount of operation, said drag estimating means comprising
(a) a means for estimating the thrust T of the flying machine,
(b) a means for detecting the following motion state parameters of the flying machine:
$\phi$: the roll attitude angle (an Eulerian angle about an X axis);
$\theta$: the pitch attitude angle (an Eulerian angle about a Y axis);
U: the speed in a direction of the X axis;
V: the speed in a direction of the Y axis;
W: the speed in a direction of the Z axis;
P: the roll angular speed (an angular speed about the X axis);
Q: the pitch angular speed (an angular speed about the Y axis);
R: the yaw angular speed (an angular speed about the Z axis);
$\alpha$: the pitch angle formed by the direction of movement of the flying machine and the center line of the flying machine,
(c) a means for calculating components Xa and Za of the air force in the directions of the X and Z axes applied to the flying machine by substituting the detected motion state into the following equations:

$$Xa = m \cdot (dU/dt + Q \cdot W - R \cdot V) + m \cdot g \cdot \sin \theta$$

$$Za = m \cdot (dW/dt + P \cdot V - Q \cdot U) - m \cdot g \cdot \cos \theta \cdot \cos \phi$$

wherein g is the gravitational acceleration, and m is the mass of the flying machine,
(d) a means for calculating the drag D of the flying machine by substituting the estimated thrust T, the detected pitch angle $\alpha$ and the calculated components Xa and Za of the air force in the directions of the X and Z axes into the following equation:

$$D = (T - Xa) \cdot \cos \alpha - Za \cdot \sin \alpha$$

wherein the operations of means (c) and (d) are carried out sequentially, after the operations of means (a) and (b) are carried out, irrespective of the order, to thereby estimate the drag of the flying machine without using a drag coefficient.

2. A drag control system according to claim 1, wherein said flying machine is an airplane, and said drag varying means is a movable wing surface provided at the rear edge of a main wing.

3. A drag control system according to claim 2, further including a compensating means for compensating for the variation in dynamic lift of the airplane by the operation of the movable wing surface.

4. A drag control system according to claim 2, further including a compensating means for compensating for the variation in pitching moment of the airplane by the operation of the movable wing surface.

5. A process for estimating the drag of a flying machine flying in the air without using a drag coefficient, comprising
(a) estimating the thrust T of the flying machine,
(b) detecting the following motion state parameters of the flying machine:
$\phi$: the roll attitude angle (an Eulerian angle about an X axis);
$\theta$: the pitch attitude angle (an Eulerian angle about a Y axis);
U the speed in a direction of the X axis;
V: the speed in a direction of the Y axis;
W: the speed in a direction of the Z axis;
P: the roll angular speed (an angular speed about the X axis);
Q: the pitch angular speed (an angular speed about the Y axis);
R: the yaw angular speed (an angular speed about the Z axis);
$\alpha$: the pitch angle formed by the direction of movement of the flying machine and the center line of the flying machine,
(c) calculating components Xa and Za of the air force in the directions of the X and Z axes applied to the flying machine by substituting the detected motion state into the following equations:

$$Xa = m \cdot (dU/dt + Q \cdot W - R \cdot V) + m \cdot g \cdot \sin \theta$$

$$Za = m \cdot (dW/dt + P \cdot V - Q \cdot U) - m \cdot g \cdot \cos \theta \cdot \cos \phi$$

wherein g is the gravitational acceleration, and m is the mass of the flying machine,
(d) calculating the drag D of the flying machine by substituting the estimated thrust T, the detected pitch angle $\alpha$ and the calculated components Xa and Za of the air force in the directions of the X and Z axes into the following equation:

$$D = (T - Xa) \cdot \cos \alpha - Za \cdot \sin \alpha$$

wherein steps (c) and (d) are carried out sequentially, after steps (a) and (b) are carried out, irrespective of the order.

6. A boundary layer control system for controlling a boundary layer formed along the surface of a main wing of an airplane, comprising a transition-point detecting means for detecting, by using a large number of hot films, the transition point at which the boundary layer is transitioned from a laminar-flow boundary layer section to a turbulent-flow boundary layer section, a movable wing surface for moving the position of the transition point along the surface of the main wing, the movable wing surface being mounted at a rear edge of the main wing, and a control means for controlling the movable Wing surface, such that the distance from a front end of the main wing to the transition point is maximized.

7. A boundary layer control system according to claim 6, wherein the compensating means is at least one of an elevator mounted on a horizontal tail plane and an elevator mounted on a canard.

8. A boundary layer control system according to claim 6, further including a compensating means for compensating for the variation in dynamic lift of the airplane generated by the operation of the movable wing surface.

9. A boundary layer control system according to claim 6, further including a compensating means for compensating for the variation in pitching moment of the airplane generated by the operation of the movable wing surface.

10. A boundary layer control system according to claim 9, wherein the compensating means is at least one of an elevator mounted on a horizontal tail plane and an elevator mounted on a canard.

11. A boundary layer control process for controlling a boundary layer formed along the surface of a main wing of an airplane, comprising a first step of detecting a transition point on the main wing of the airplane at which the boundary layer is transitioned from a laminar-flow boundary layer section to a turbulent-flow boundary layer section, a second step of moving the position of the transition point rearwards using a movable wing surface mounted at a rear edge of the main wing, a third step of stopping the operation of the movable wing surface, when the rearward movement of the transition point stops, and a fourth step of repeating said second and third steps, when the transition point starts moving, wherein the process maximizes the length of the laminar-flow boundary layer thereby minimizing the drag.

12. A system for estimating the drag of a flying machine flying in the air without using a drag coefficient, comprising (a) a means for estimating the thrust T of the flying machine, (b) a means for detecting the following motion state parameters of the flying machine:

ϕ: the roll attitude angle (an Eulerian angle about an X axis);
θ: the pitch attitude angle (an Eulerian angle about a Y axis);
U: the speed in a direction of the X axis;
V: the speed in a direction of the Y axis;
W: the speed in a direction of the Z axis;
P: the roll angular speed (an angular speed about the X axis);
Q: the pitch angular speed (an angular speed about the Y axis);
R: the yaw angular speed (an angular speed about the Z axis);
α: the pitch angle formed by the direction of movement of the flying machine and the center line of the flying machine, (c) a means for calculating components Xa and Za of the air force in the directions of the X and Z axes applied to the flying machine by substituting the detected motion state into the following equations:

$$Xa = m \cdot (dU/dt + Q \cdot W - R \cdot V) + m \cdot g \cdot \sin\theta$$

$$Za = m \cdot (dW/dt + P \cdot V - Q \cdot U) - m \cdot g \cdot \cos\theta \cdot \cos\phi$$

wherein g is the gravitational acceleration, and m is the mass of the flying machine, (d) a means for calculating the drag D of the flying machine by substituting the estimated thrust T, the detected pitch angle α and the calculated components Xa and Za of the air force in the directions of the X and Z axes into the following equation:

$$D = (T - Xa) \cdot \cos\alpha - Za \cdot \sin\alpha$$

wherein the operations of the means (c) and the means (d) are carried out sequentially, after the operations of the means (a) and the means (b) are carried out, irrespective of the order.

13. A drag control process for reducing the drag of a flying machine flying in the air, comprising a first step of increasing a steering angle of a flap by a predetermined initial value, a second step of estimating a drag every time the steering angle of the flap is increased, a third step of calculating a difference between a current value and a previous value of the drag every time the steering angle of the flap is increased, and a fourth step of reducing the steering angle of the flap if the difference is positive and increasing the steering angle of the flap if the difference is negative, after increasing the steering angle of the flap by the predetermined initial value.

14. A process for reducing the drag of a flying machine flying in the air according to claim 13, wherein the second step of estimating the drag comprises (a) estimating the thrust T of the flying machine, (b) detecting the following motion state parameters of the flying machine:

ϕ: the roll attitude angle (an Eulerian angle about an X axis);
θ: the pitch attitude angle (an Eulerian angle about a Y axis);
U: the speed in a direction of the X axis;
V: the speed in a direction of the Y axis;
W: the speed in a direction of the Z axis;
P: the roll angular speed (an angular speed about the X axis);
Q: the pitch angular speed (an angular speed about the Y axis);
R: the yaw angular speed (an angular speed about the Z axis);
α: the pitch angle formed by the direction of movement of the flying machine and the center line of the flying machine, (c) calculating components Xa and Za of the air force in the directions of the X and Z axes applied to the flying machine by substituting the detected motion state into the following equations:

$$Xa = m \cdot (dU/dt + Q \cdot W - R \cdot V) + m \cdot g \cdot \sin\theta$$

$$Za = m \cdot (dW/dt + P \cdot V - Q \cdot U) - m \cdot g \cdot \cos\theta \cdot \cos\phi$$

wherein g is the gravitational acceleration, and m is the mass of the flying machine, (d) calculating the drag D of the flying machine by substituting the estimated thrust T, the detected pitch angle α and the calculated components Xa and Za of the air force in the directions of the X and Z axes into the following equation:

$$D = (T - Xa) \cdot \cos\alpha - Za \cdot \sin\alpha$$

wherein steps (c) and (d) are carried out sequentially, after steps (a) and (b) are carried out, irrespective of the order, to thereby estimate the drag of the flying machine without using a drag coefficient.

15. A process for reducing the drag of a flying machine flying in the air according to claim 13, wherein the increase and decrease amount of the steering angle of the flap is set at $-\Delta a \times (\Delta d/K)$ in the fourth step wherein $\Delta a$ is the initial value, $\Delta d$ is an amount of change of the drag and K is a constant.

* * * * *